United States Patent [19]
Rochette

[11] 3,838,793
[45] Oct. 1, 1974

[54] AUTOMATIC MEASURING VALVE SYSTEM

[76] Inventor: Georges Omer Rochette, 7 Eastwood Pl., Apt. No. 5, Vanier, Ontario X1L 6X1, Canada

[22] Filed: Sept. 6, 1972

[21] Appl. No.: 286,779

[30] Foreign Application Priority Data
Sept. 9, 1971 Canada .............................. 122436

[52] U.S. Cl................... 222/76, 222/309, 222/334, 222/389
[51] Int. Cl.............................................. B67d 5/06
[58] Field of Search ............ 222/76, 389, 258, 261, 222/262, 309, 334, 14

[56] References Cited
UNITED STATES PATENTS
2,755,966  7/1956  Lindars ........................... 222/389 X
2,770,394  11/1956  Mueller .......................... 222/389 X
2,946,488  7/1960  Kraft ............................... 222/309 X
3,194,434  7/1965  Evanson .......................... 222/76 X
3,598,287  8/1971  DeMan ........................... 222/334 X

*Primary Examiner*—Allen N. Knowles
*Assistant Examiner*—Joseph J. Rolla
*Attorney, Agent, or Firm*—Stevens, Davis, Miller & Mosher

[57] ABSTRACT

A measuring valve system for a liquid dispenser comprises a measuring cylinder with a piston free to move inside and defining a measuring chamber. The piston is actuated by air under pressure to move in one direction and by a spring to move in the other direction. The measuring chamber is in normally open connection with the liquid supply. There are two check valves: a normally open one between the liquid supply and the measuring chamber and a normally closed one at the exit of the measuring chamber.

8 Claims, 1 Drawing Figure

PATENTED OCT 1 1974    3,838,793
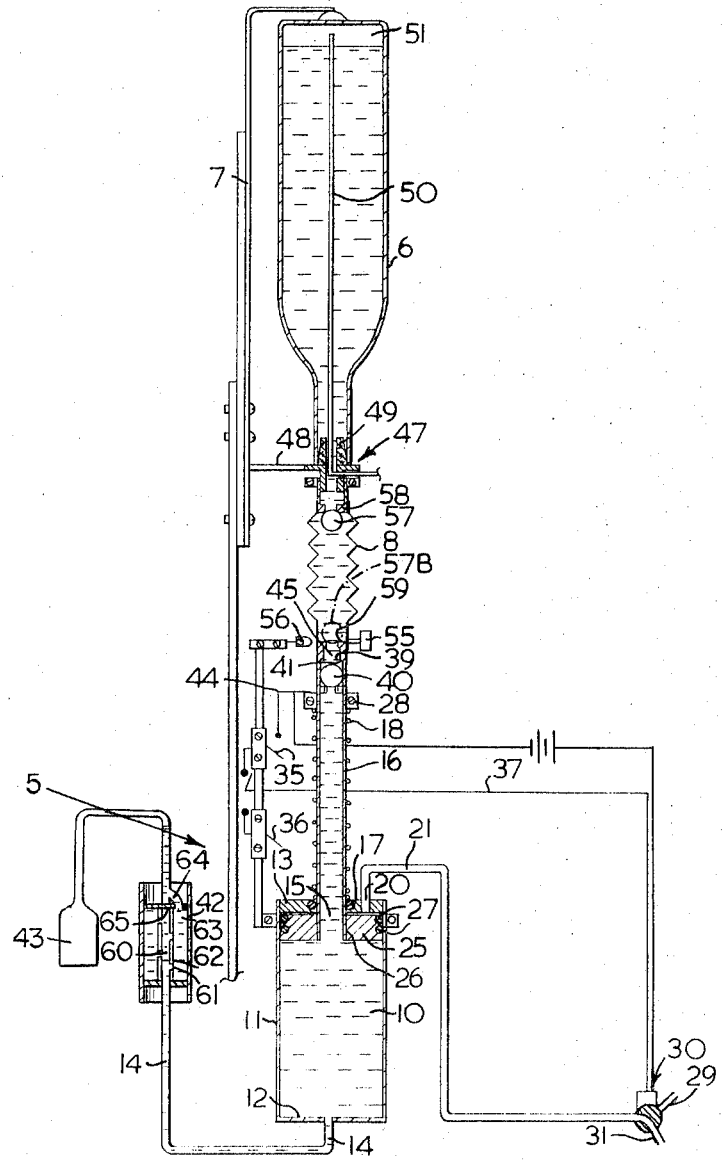

AUTOMATIC MEASURING VALVE SYSTEM

This invention relates to an automatic measuring and dispensing valve system for liquids.

In systems for automatic dispensing of a measured amount of liquid, as for example to measure an alcoholic beverage into a glass, two types of measuring system are known. The first of these has a piston operating in a cylinder under the influence of gravity or a weak spring. This system renders unnecessary the use of air under pressure which can contaminate the ingredients dispensed, but the dispensing process is very slow. The second type uses air under pressure to push against the liquid to be dispensed. This latter type works quickly but the pressurized air, if not purified, can contaminate the ingredients. Additionally, such systems may dispense incorrectly measured portions when the air pressure is not constant.

An object of the present invention is to provide a measuring system using pressurized air but avoiding contamination of the liquid dispensed by the pressurized air. A further object is to prevent variations in measurement due to air pressure variations.

A particular embodiment of the novel system will be described further with respect to the drawing which is a cross-sectional view of an automatic measuring and dispensing valve system according to the invention.

Referring now to the drawing, an automatic measuring and dispensing valve system 5 is shown together with a bottle 6 of liquid to be dispensed, and a support 7 to hold the bottle in inverted form. A corrugated tube 8 links the bottle 6 with the dispensing valve system.

The dispensing valve 5 comprises a cylinder 11 having a lower end 12 and an upper end 13. The lower end 12 has a hole to admit a tube 14. The upper end 13 has two holes 15 and 20. Through the hole 15 slidably passes a tube 16 which continues into the cylinder and passes through a piston 25 therein. An O-ring 17 is fixed within the hole 15, in a suitable groove in top end 13 to provide a tight sliding fit between tube 16 and end 13. A compression spring 18 is coiled about the tube 16 outside the cylinder. The hole 20 has fixed tightly in it a tube 21. The portion of the cylinder below the piston 25 defines a measuring chamber 10.

The piston 25 has a hole 26 in its center through which tube 16 passes. The lower end of tube 16 is fixed flush with the bottom of the piston 25. Suitably, two O-rings 27 are arranged in grooves in the sides of the piston so as to form a fluid seal as the piston slides. The piston 25 and the attached tube 16 can slide downwardly and upwardly within the cylinder 11.

The tube 16 is connected at its upper end to the check valve 39. This check valve comprises a ball 40, which is retained from falling downward into the cylinder 11 by suitable means through which liquid can pass and a seat 41 against which the ball 40 can seat to prevent liquid flow in an upward direction. Check valve 39 is attached at one end to tube 16 and at the other to the corrugated tube 8. The retaining member 28 also forms a seat for one end of the compression spring 18, the other end of which is seated against the end 13 of the cylinder 11.

Also attached to the retaining member 28 is a switch arm 44. This is adapted to contact in sequence two switches 35 and 36. Electrical connections shown diagrammatically as 37 are operable to activate a solenoid valve 30 by either of switch 35 or 36, according to a selection made manually by an operator.

The tube 8 is connected to the bottle 6 through a connector shown generally as 47. This connector comprises a clamp 48, which connects the neck of the bottle rigidly to the stand 7, a cork 49 with a passage therethrough to permit liquid to flow into the corrugated tube 8, and a vent 50 to atmosphere, which extends through the cork and upwardly to an air space above the liquid level in the bottle.

Tube 21 runs from the space in the cylinder 11 between the piston 25 and the top end 13 to the solenoid 30. The solenoid is operable to connect the tube 21 selectively with a source of compressed air 29 or a vent 31 leading to atmosphere.

The tube 14 flows from the bottom of the cylinder to a suitable dispensing outlet. A valve 42 in the line 14 operates to permit outward flow when a predetermined fluid pressure is exceeded, and to prevent backward flow at any time. Suitably this valve is formed from a continuation 60 of line 14 having holes 61 in the sides and a wall 65 at its end. Around the holes 61 is positioned an elastic tube 62 which is capable of expanding when fluid pressure in tube 60 exceeds a predetermined amount. When the tube expands, liquid can flow from tube 60 through holes 61 into chamber 63, thence through outlets 64 to a continuation of the tube 14, thence to dispensing spout 43.

When the system is not being used to dispense liquid, the solenoid valve 30 is in position such that the line 31 is open to the tube 21, so that the pressure in the tube 21 is atmospheric. Under these conditions, the compression spring 18 is sufficiently strong to cause the piston 25 to assume its uppermost position, right against the top end 13 of the cylinder. The liquid from the bottle 6 fills the corrugated tube 8, the tube 16 and the portion of the cylinder 11 below the piston 25. The tube 14 is also filled with this liquid, but the valve 42 prevents the liquid from passing out of the spout 43.

When it is decided to use the system to dispense some liquid, the solenoid valve 30 is energized. The solenoid then acts to close off the tube 31, and to put the tube 29 in contact with the tube 21. Compressed air then passes in through the tube 21 to the space between the piston 25 and the top end 13 of the cylinder. This causes the piston to move downwardly in the cylinder.

As the piston moves downwardly, the liquid in the cylinder 11 is pressurized. Some liquid flow therefore starts up the tube 16. Such flow moves the ball 40 tightly against the ball seat 41, blocking the orifice 45. The pressure of the liquid in the tube 14 is soon enough to open the check valve 42, and to permit discharge through the spout 43.

As the piston 25 moves downwardly in the cylinder 11 under the action of the compressed air, indicator arm 44 moves downwardly with it, as the indicator arm is rigidly attached to retaining member 28 and tube 16, both of which are rigidly attached to the piston. As the arm descends, it contacts the switch 35. If this switch is connected by circuit 37 to solenoid 30, it actuates the solenoid. If the cirucit 37 is connected to switch 36 instead of switch 35, the solenoid is not actuated until the arm 44 contacts the switch 36. When the solenoid is actuated, the connection of tube 21 to compressed air source 29 is severed, and instead the tube 21 is put in connection with atmosphere through vent 31. The piston 25 then begins to ascend, under the force of the compression spring 18, which overcomes the atmospheric pressure resistance to ascension.

As the piston ascends in the cylinder, check valve 42 closes again and forms an airtight seal. A partial vacuum is then created in cylinder 11 and tube 16. This partial vacuum causes the ball 40 to unseat itself from the valve seat 41, and therefore permits more liquid to flow through the orifice 45 into the measuring chamber 10 through the piston 25. As liquid flows out of the bottle 6, air enters the space above the liquid through tube 50, forming an airspace 51 in the upper part of the bottle 6.

It will be noted that any gases generated in the liquid being stored will merely bubble up through the system and end up in the air space 51, which is in contact with the atmosphere. Thus, the system will prevent vapor locks, which form serious problems in many dispensing valve systems.

The provision of the two switches 35 and 36, selectively operable by means of circuitry 37, permits the operator to select which of two measured amounts of liquid is to be dispensed. As switch 36 is lower than switch 35, a larger amount of liquid will be dispensed if switch 36 is used before the solenoid is tripped by the contact of indicator arm 44. It will be obvious that more switches could be installed at different heights if a larger choice of measured amounts is desirable. Alternately if the same measured amount is to be dispensed each time, only a single switch 35 is needed, and switch 36 can be omitted.

If desired, the measuring valve system according to the invention can be used with a convenient empty indicating system. This comprises a source of light 56, a photocell 55, a floating ball 57 and two ball stoppers 58 and 59 located respectively at the top and at the bottom of the tube 8. When the tube 8 is empty, the ball 57 moves down to the position 57B and stays there cutting the light beam passing into the photocell 55. The portion of the tube 8 at the level marked 57B is transparent. Restricted portions 58 and 59 are provided to limit travel of the ball.

Every time the piston descends to dispense liquid, the light beam may be cut by an opaque portion of the tube 8. When the piston rises, the ball 57 will also descend to level 57B because of the motion of liquid filling the measuring compartment 10. For this reason, the photocell is connected to a warning light through a time delay circuit so that the warning light will not operate to indicate that the bottle is empty unless the photocell is blocked off from the light source for more than a predetermined time.

It will be obvious that two or more valves containing different ingredients can be combined together and attached to the same spout 43, so that different ingredients can be dispensed and different ingredients in the same or in different quantities can be mixed during dispensing.

The system described above provides a measuring system using pressurized air but prevents contamination since the pressurized air is never in contact with the ingredient dispensed. Variations in measurement due to variations in air pressure are avoided because the measurement is controlled by a constant volume that is determined by the length of the path travelled by the piston before the switch 35 or 36 is actuated.

It is understood that the foregoing is a description of one embodiment of invention only, and that the modifications thereof will be obvious to one skilled in the art, without departing from the scope and spirit of the invention, which is as described in the appended claims.

The embodiments of the invention in which an exclusive property or privilege is claimed are defined as follows:

1. A measuring valve for a liquid dispensing system which comprises:

a cylinder with a substantially vertically oriented axis;

a piston moveable in said cylinder and dividing said cylinder transversely to the axis thereof into first and second fluid chambers; said first chamber comprising the portion of the cylinder below the piston and said second chamber comprising the portion of the cylinder above the piston;

normally open supply means for supplying a liquid to be dispensed through said piston into said first chamber at the top of said first chamber; a normally closed outlet in communication with the bottom of said first chamber;

means for supplying a compressed fluid to said second chamber whereby to cause said piston to move in said cylinder to decrease the size of said first chamber;

means for closing said normally open supply means and for opening said normally closed outlet responsive to the increase of pressure of liquid in said first chamber as said first chamber decreases in size, whereby to dispense liquid through said outlet as said first chamber decreases in size;

a plurality of pre-set control means each operable to shut off said means for supplying compressed fluid to said second chamber when the size of said first chamber has decreased a predetermined amount, the predetermined amount being different for each of said control means; and means for selectively actuating a selected one of said control means corresponding to a desired decrease in the size of said first chamber.

2. A measuring valve as claimed in claim 1, additionally comprising means for venting said second chamber to atmosphere when said supply of compressed fluid into it is stopped, and means operative when no compressed fluid is present in said second chamber to urge said piston in a direction to decrease the size of said second chamber.

3. A measuring valve as claimed in claim 2 in which said means for closing said normally open supply means is a ball valve, the ball of which becomes seated to close said supply means in resonse to increase of liquid pressure.

4. A measuring valve as claimed in claim 2 in which said means for opening said normally closed outlet is a valve which opens in response to increase of liquid pressure.

5. A measuring valve as claimed in claim 1 additionally comprising empty indicating means which comprise:

a ball moveable between a first position and a second position in said supply means, said second position being lower than said first position and said ball being of a density less than said liquid whereby it tends to rise in said liquid;

sensing means for determining when said ball is in said second position; and signalling means to signal an empty condition when said ball remains in said second position more than a predetermined time.

6. A measuring valve as claimed in claim 1 in which said means for closing said normally open supply means is a ball valve, the ball of which becomes seated to close said supply means in response to increase of liquid pressure.

7. A measuring valve as claimed in claim 1 in which said means for opening said normally closed outlet is a valve which opens in response to increase of liquid pressure.

8. Apparatus according to claim 1 in which said means for supplying a compressed fluid comprises a valve connected to a source of compressed fluid, and said control means comprise a series of switches, means for selectively energizing said switches so that actuation of a selected switch will shut off the valve, and an actuator rigidly linked with said piston and sequentially contacting each of said series of switches as the size of said first chamber is decreased.

* * * * *